US008833394B2

(12) United States Patent  
McCoy et al.

(10) Patent No.: US 8,833,394 B2  
(45) Date of Patent: Sep. 16, 2014

(54) WATER SUPPLY VALVE

(75) Inventors: Daniel L. McCoy, Nampa, ID (US); Leonard G. Franklin, Jr., Nampa, ID (US)

(73) Assignee: Ayrlett, Inc., Nampa, ID (US)

( * ) Notice: Subject to any disclaimer, the term of this patent is extended or adjusted under 35 U.S.C. 154(b) by 499 days.

(21) Appl. No.: 13/206,711

(22) Filed: Aug. 10, 2011

(65) Prior Publication Data

US 2012/0037826 A1 Feb. 16, 2012

Related U.S. Application Data

(60) Provisional application No. 61/373,644, filed on Aug. 13, 2010.

(51) Int. Cl.  
*F16K 11/085* (2006.01)  
*F16K 5/04* (2006.01)  
*F16K 31/60* (2006.01)

(52) U.S. Cl.  
CPC ........... *F16K 11/0853* (2013.01); *F16K 5/0492* (2013.01); *F16K 5/0442* (2013.01); *F16K 31/602* (2013.01)  
USPC ....... 137/625.47; 137/270; 251/288; 251/289

(58) Field of Classification Search  
USPC .............. 137/625.47, 269–271; 251/288, 289  
See application file for complete search history.

(56) References Cited

U.S. PATENT DOCUMENTS

| 1,376,109 | A | | 4/1921 | Miller |
| 2,997,057 | A | | 8/1961 | Toth |
| 3,234,958 | A | | 2/1966 | Butters |
| 3,774,604 | A | * | 11/1973 | Danielsson .............. 604/167.05 |
| 4,566,480 | A | * | 1/1986 | Parham ......................... 137/271 |
| 4,611,626 | A | | 9/1986 | Logsdon |
| 4,778,152 | A | | 10/1988 | Logman |
| 4,911,202 | A | | 3/1990 | Nelson |
| 4,987,924 | A | | 1/1991 | Rush et al. |
| 5,365,978 | A | | 11/1994 | Woods |
| 5,573,224 | A | | 11/1996 | Kim |
| 5,622,351 | A | | 4/1997 | Kim |
| 5,647,389 | A | | 7/1997 | Holloway |
| 5,988,220 | A | | 11/1999 | Sakaki |
| 5,996,603 | A | | 12/1999 | Dupler |
| 6,206,028 | B1 | | 3/2001 | Holden et al. |
| 6,874,759 | B2 | * | 4/2005 | Aoshima et al. .............. 251/309 |
| 6,913,245 | B2 | | 7/2005 | Jacoway |
| 7,000,896 | B2 | | 2/2006 | Gross |
| 7,373,953 | B2 | | 5/2008 | Minnick |
| 7,771,383 | B2 | * | 8/2010 | Truitt et al. ..................... 604/32 |
| 8,584,701 | B2 | * | 11/2013 | Duncan ......................... 137/555 |
| 2006/0027779 | A1 | | 2/2006 | McGuire et al. |

* cited by examiner

*Primary Examiner* — John Fox  
(74) *Attorney, Agent, or Firm* — Buchanan Nipper

(57) ABSTRACT

A water supply valve comprising a valve body having a first orifice and a second orifice, a rotatable valve shaft, and a handle. The rotatable valve shaft can be inserted into the first orifice or the second orifice, thereby converting the water supply valve from first configuration where the handle is on the left side to a second configuration where the handle is on the right side.

20 Claims, 11 Drawing Sheets

WATER SUPPLY VALVE

PRIORITY/CROSS-REFERENCE TO RELATED APPLICATIONS

This application claims the benefit of U.S. Provisional Application No. 61/373,644, filed 13 Aug. 2010, the disclosure of which is incorporated by reference.

TECHNICAL FIELD

The disclosure generally relates to the field of plumbing. Particular embodiments relate to water supply valves.

BACKGROUND

Water supply valves take many forms, including water supply valves having a "left-side" handle and water supply valves having a "right-side" handle. In some installations, a plumber will typically install a right-side handled water supply valve on the left (hot water) side and a left-side handled water supply valve on the right (cold water) side so that both handles are adjacent one another.

A problem arises where while installing the water supply valves the plumber realizes that he/she has two "left-side" valves or two "right-side" valves, resulting in the plumber needing to obtain (whether it be from the plumber's work vehicle, a storage location, or a supplier) the "other" sided valve to correctly proceed with the installation.

SUMMARY OF THE DISCLOSURE

Several exemplary water supply valves are described herein, including exemplary water supply valves convertible between a first side mode and a second side mode.

An exemplary water supply valve comprises a valve body, a rotatable valve shaft, and a handle. The valve body having a valve chamber defined between a first orifice and a second orifice. The valve body having a first port extending via a first passageway to the valve chamber, and a second port extending via a second passageway to the valve chamber.

The rotatable valve shaft having an axis of rotation. The rotatable valve shaft having a first valve shaft port and a second valve shaft port. The first valve shaft port and the second valve shaft port fluidly connected via a valve shaft passageway. The valve shaft ports normally registering with the valve body passageways. The rotatable valve shaft rotatable about the axis between a first position and a second position. The second position corresponding to port registration (valve open), and the first position corresponding to complete closing of at least one of the valve shaft ports (valve closed). The rotatable valve shaft further comprising a first sealing means for sealing the first orifice (when in the first side mode), and a second sealing means for sealing the second orifice (when in the first side mode). The rotatable valve shaft comprising a handle connector for connecting with a handle.

The handle for connecting with the handle connector. The handle permitting a user to rotate the rotatable valve shaft between the first position and the second position.

The water supply valve comprising the first side mode wherein the rotatable valve shaft first end is inserted through the first orifice and into the valve chamber, and the second side mode wherein the rotatable valve shaft first end is inserted through the second orifice and into the valve chamber.

Another exemplary water supply valve comprises a valve body, a rotatable valve shaft, and a handle. The valve body comprising a valve body first end comprising a first orifice, and a valve body second end comprising a second orifice. The valve body comprising a valve chamber defined between the first orifice and the second orifice. The valve body comprising a first valve body port extending via a first passageway to the valve chamber, a second valve body port extending via a second passageway to the valve chamber, and a third valve body port extending via a third passageway into the valve chamber.

The rotatable valve shaft comprising a rotatable valve shaft first end and a rotatable valve shaft second end. The rotatable valve shaft having an axis of rotation. The rotatable valve shaft comprising a first valve shaft port, a second valve shaft port, and a third valve shaft port. The valve shaft ports fluidly connected via a valve shaft passageway. The valve shaft ports normally registering with the valve body passageways. The rotatable valve shaft rotatable about the axis between a first position and a second position. The first position corresponding to port registration, and the second position corresponding to complete closing of at least one of the valve shaft ports. The rotatable valve shaft further comprising a first sealing means for sealing the first orifice (when in the first side mode), and a second sealing means for sealing the second orifice (when in the first side mode). The first end comprising a handle connector for connecting with a handle.

The handle for connecting with the handle connector. The handle permitting a user to rotate the rotatable valve shaft between the first position and the second position.

The water supply valve comprising the first side mode wherein the rotatable valve shaft first end is inserted through the first orifice and into the valve chamber, and the second side mode wherein the rotatable valve shaft first end is inserted through the second orifice and into the valve chamber.

Another exemplary water supply valve comprises a valve body, a rotatable valve shaft, and a handle. The valve body comprising: a valve body first end comprising a first orifice, a valve body second end comprising a second orifice, a valve chamber defined between the first orifice and the second orifice, a first valve body port extending via a first passageway to the valve chamber, a second valve body port extending via a second passageway to the valve chamber, and a third valve body port extending via a third passageway into the valve chamber.

The rotatable valve shaft comprising a rotatable valve shaft first end and a rotatable valve shaft second end. The rotatable valve shaft having an axis of rotation. The rotatable valve shaft having a first valve shaft port, a second valve shaft port, and a third valve shaft port. The valve shaft ports fluidly connected via a valve shaft passageway. The valve shaft ports normally registering with the valve body passageways. The rotatable valve shaft rotatable about the axis between a first position and a second position, wherein the first position corresponds to port registration, and the second position corresponds to complete closing of at least one of the valve shaft ports. The rotatable valve shaft further comprising a first sealing means for sealing the first orifice (when in the first side mode), and a second sealing means for sealing the second orifice (when in the first side mode). The first end comprising a handle connector for connecting with a handle. The first end comprising a first stop and a second stop defining a first recess there-between. The second end comprises a third stop and a fourth stop defining a second recess there-between.

The handle for connecting with the handle connector. The handle permitting a user to rotate the rotatable valve shaft between the first position and the second position.

The water supply valve comprising the first side mode wherein the rotatable valve shaft first end is inserted through the first orifice and into the valve chamber, and the second side mode wherein the rotatable valve shaft first end is inserted through the second orifice and into the valve chamber.

The handle further comprising a flange configured for receipt into the first recess when the water supply valve is in the first side mode, and configured for receipt into the second recess when the water supply valve is in the second side mode. Wherein when the first side mode, the first, second and third ports are fluidly connected, and when in the second side mode, only the second and third ports are fluidly connected.

Additional understanding of the devices contemplated and/or claimed by the inventors can be gained by reviewing the detailed description of exemplary devices, presented below, and the referenced drawings.

DETAILED DESCRIPTION

Figure 1:
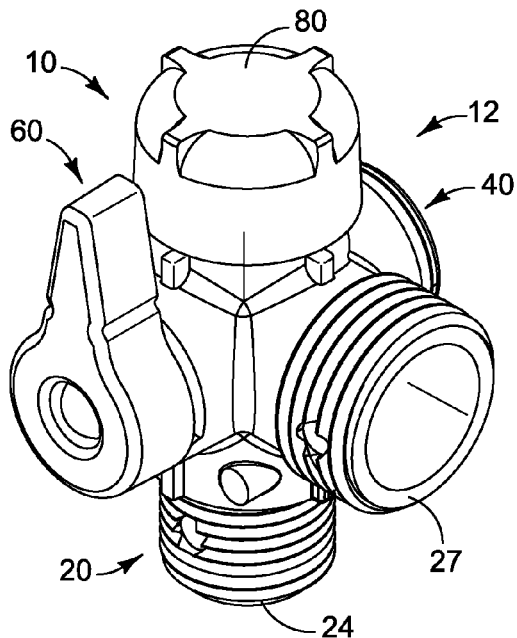
FIG. 1 is a perspective view of a first exemplary water supply valve, shown in a first side mode, with the handle in its first (closed) position.

The following description and the referenced drawings provide illustrative examples of that which the inventors regard as their invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The use of "e.g.," "etc," "for instance," "in example," and "or" and grammatically related terms indicates non-exclusive alternatives without limitation, unless otherwise noted. The use of "including" and grammatically related terms means "including, but not limited to,", unless the context clearly dictates otherwise. The use of the articles "a," "an" and "the" are meant to be interpreted as referring to the singular as well as the plural, unless the context clearly dictates otherwise. Thus, for example, reference to "a port" includes two or more such ports, and the like. The use of "exemplary", means "an example of" and is not intended to convey a meaning of an ideal or preferred embodiment. The use of "water" and grammatically related terms means "any liquid or gaseous medium," unless the context clearly dictates otherwise.

A first exemplary water supply valve 10 is illustrated in FIGS. 1 through 9. The water supply valve 10 convertible between a first side mode 12 (illustrated in FIGS. 1, 2 and 5) and a second side mode 14 (illustrated in FIGS. 3, 4 and 6). The water supply valve 10 comprising three main components: a valve body 20, a rotatable valve shaft 40, and a handle assembly 60.

The valve body 20 having a first end 32 and a second end 33. The first end 32 comprises a first orifice 18, the second end 33 having a second orifice 19. A valve chamber 22 is defined between the first orifice 18 and the second orifice 19.

The valve body 20 having a first port 24, a second port 27, and a third port 30. The first port 24 extending via a first passageway 15 to a first port orifice 25 at the valve chamber 22, a second port 27 extending via a second passageway 16 to a second port orifice 28 at the valve chamber 22, and the third port 30 extending via a third passageway 17 to a third port orifice 31 at the valve chamber 22.

In exemplary water supply valves, the first body port is configured for attachment to plumbing connections. For instance, the first valve body port 24 could comprise threading 26 configured for threaded attachment to a plumbing connection, such as a water supply line, via a connector portion, such as the threaded male portion 81 illustrated in FIG. 12.

Figure 12:
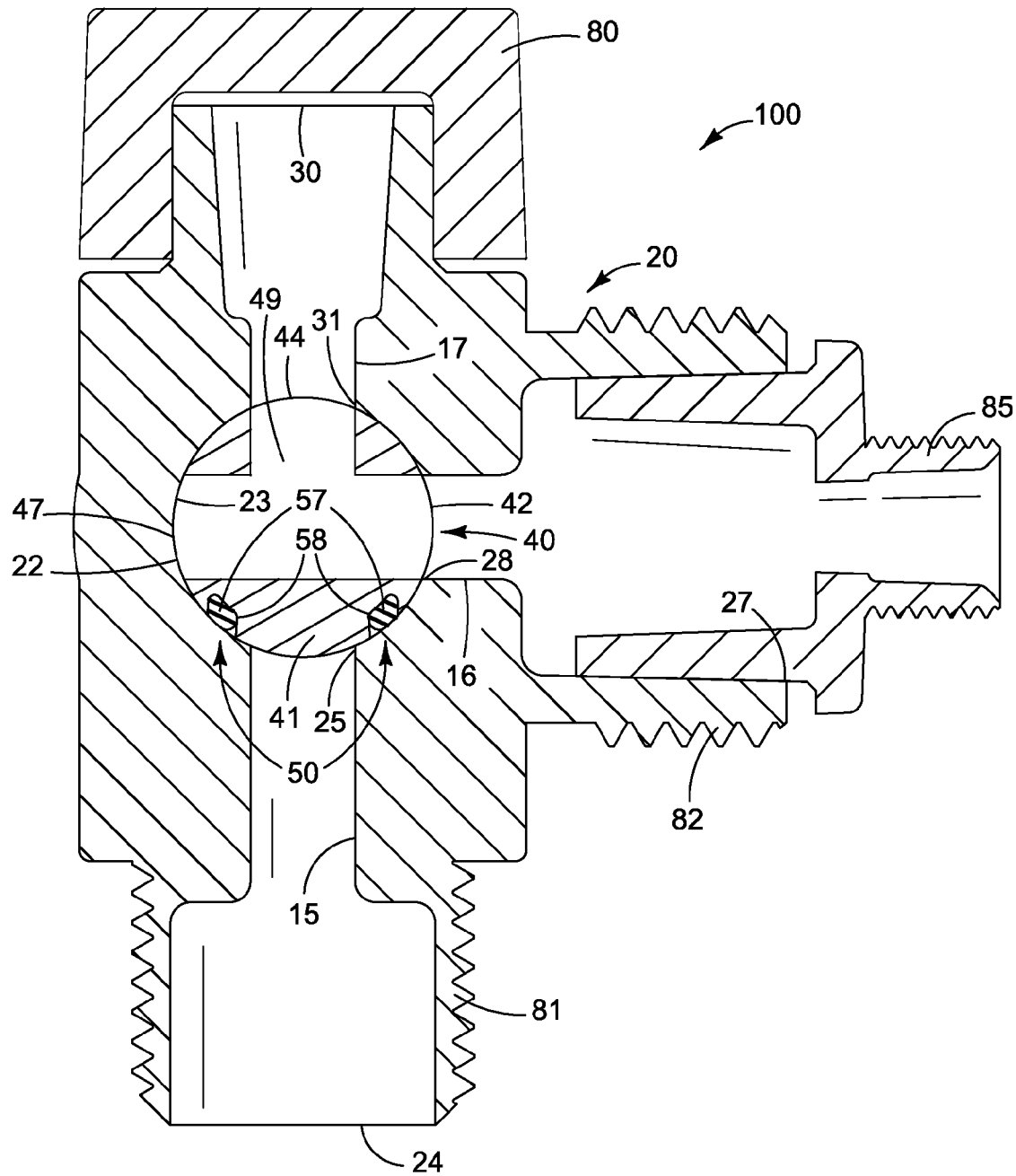
FIG. 12 is a cross-sectional view of the second exemplary water supply valve of FIG. 11.

In exemplary water supply valves, the second body port 27 is configured for attachment to plumbing connections. For instance, the second valve body port 27 could connect with an ice maker adapter 85 (as illustrated in FIGS. 10 through 13, and 21) for connecting with a water supply line for an ice maker. The second valve body port 27 may further comprise a connector portion, such as the male portion 82 having threads 29, as illustrated in FIG. 12.

For instance, the third valve body port 30 could connect to a plumbing connector (e.g., a plumbing fitting (such as cap 80 (illustrated in FIGS. 1 through 6, and 10 through 13) closing the third valve body port 30), water hammer arrester 90 (illustrated in FIG. 21)). The third valve body port 30, may further comprise a connector portion, such as the unthreaded male portion 21 illustrated in FIGS. 7 and 8.

An exemplary rotatable valve shaft 40 is illustrated in FIGS. 9, 14 through 18, and 20. The rotatable valve shaft 40 comprises a first end 43 and a second end 45 defining a length there-between, the rotatable valve shaft 40 having an axis of rotation along said length. The rotatable valve shaft 40 having a first port 42, a second port 44, and a third shaft port 47.

The rotatable valve shaft also comprising a port sealing means 50. The port sealing means 50 for sealing a port (e.g., sealing the first orifice 25 when the water supply valve is in its closed configuration (as illustrated in FIG. 12)). The port sealing means 50 comprising an annular groove 58 for receiving an O-ring 57 therein. The O-ring 57 for sealing against the seal surface 23 of the valve chamber 22. O-rings are just one form of a sealing means that could be utilized.

Figure 13:
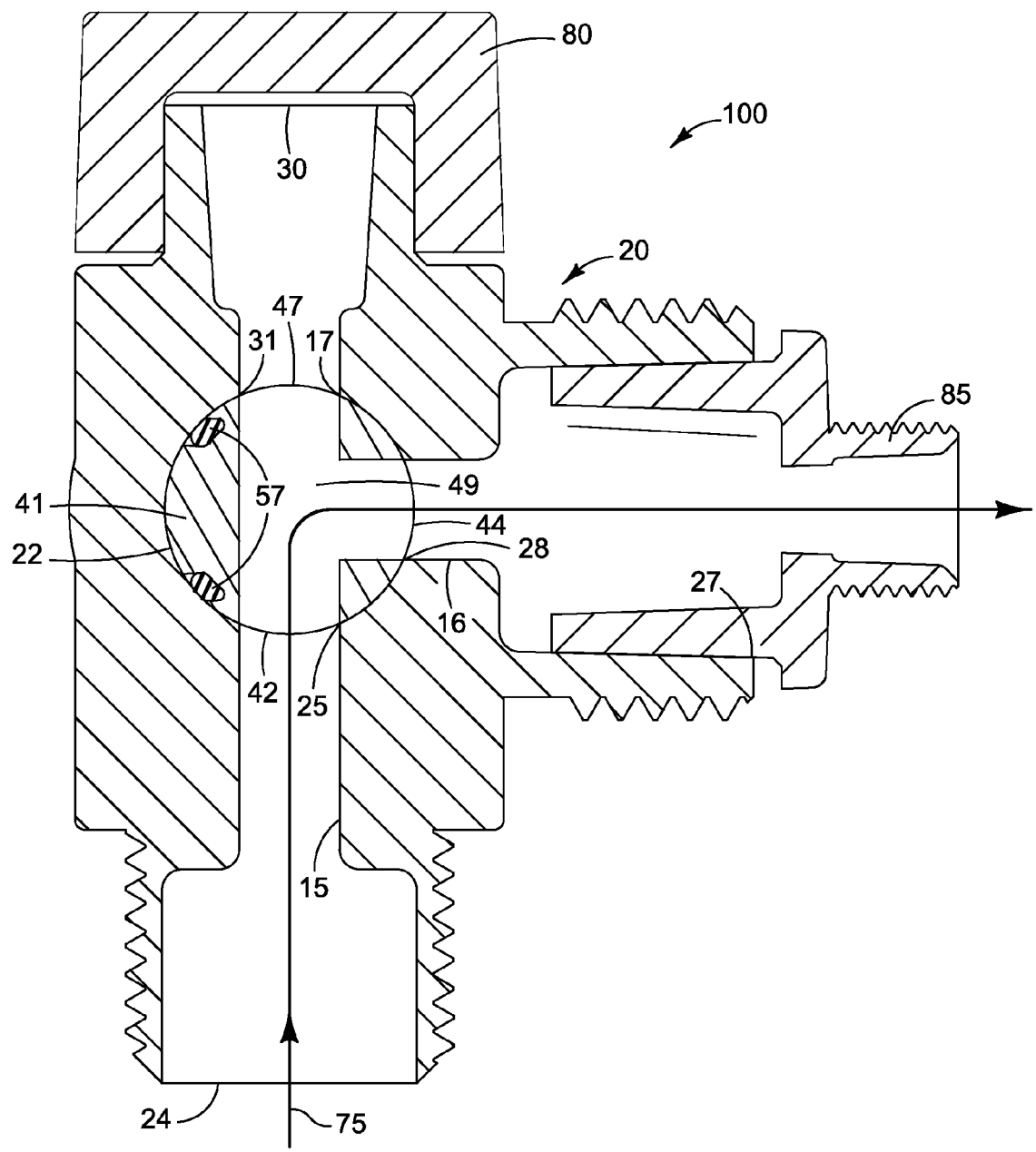
FIG. 13 is a cross-sectional view of the second exemplary water supply valve of FIG. 10.
Figure 14:
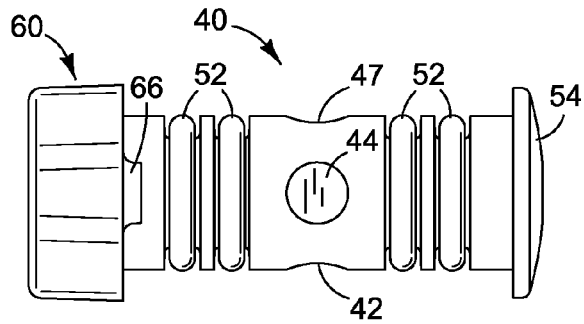
FIG. 14 is a top side view of the handle and rotatable valve shaft of an exemplary water supply valve.
Figure 15:
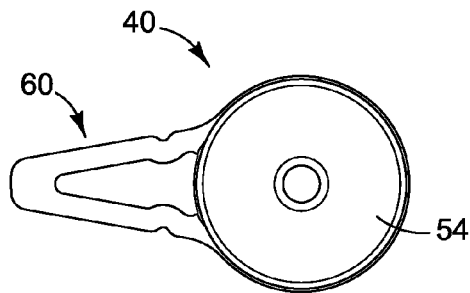
FIG. 15 is a first end view of the handle and rotatable valve shaft of an exemplary water supply valve.
Figures 16, 17:
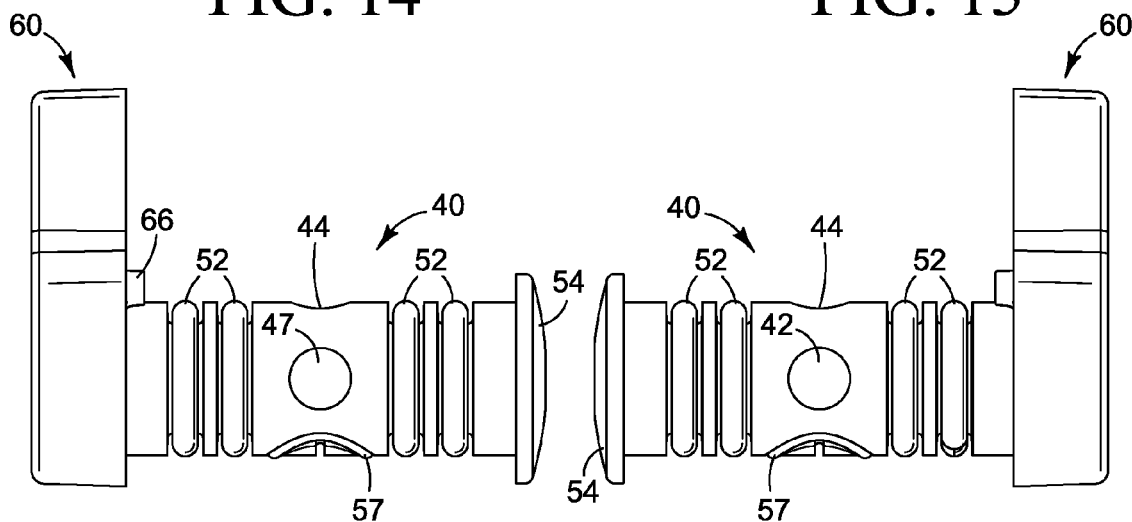
FIG. 16 is a front side view of the handle and rotatable valve shaft of an exemplary water supply valve.
FIG. 17 is a back side view of the handle and rotatable valve shaft of an exemplary water supply valve.
Figure 18:
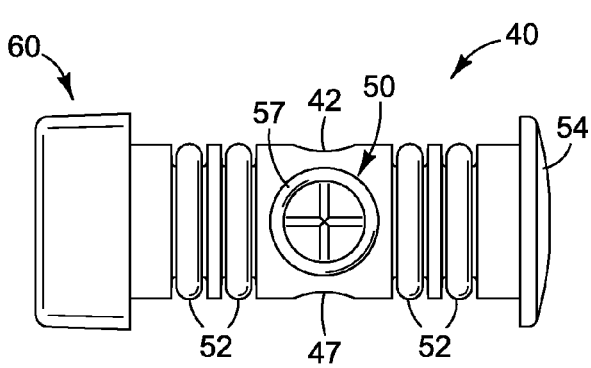
FIG. 18 is a bottom side view of the handle and rotatable valve shaft of an exemplary water supply valve.
Figure 19:
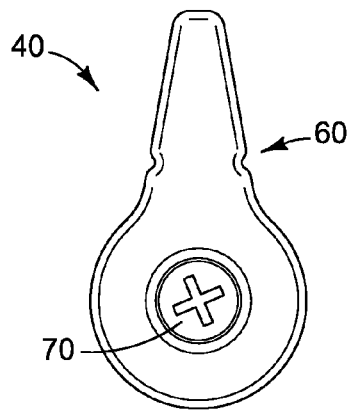
FIG. 19 is a second end view of the handle and rotatable valve shaft (hidden) of an exemplary water supply valve.

The valve shaft ports (42, 44, 47) are fluidly connected via a valve shaft passageway 49. The valve shaft ports (42, 44, 47) normally register with the valve body passageways (15, 16, 17), as shown in FIG. 13.

Figure 2:
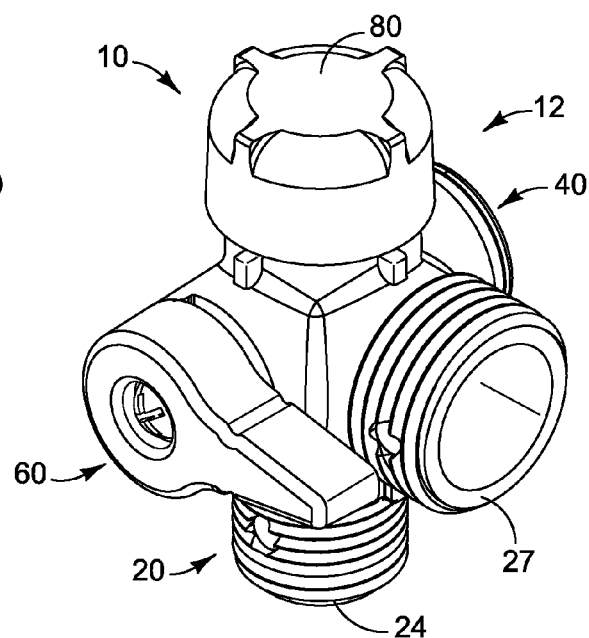
FIG. 2 is a second perspective view of the first exemplary water supply valve, shown in a first side mode, with the handle in its second (open) position.
Figure 3:
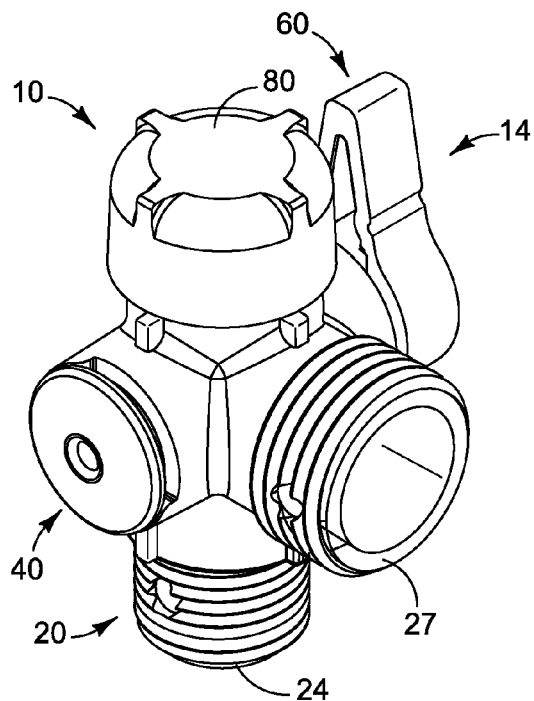
FIG. 3 is a perspective view of a first exemplary water supply valve, shown in a second side mode, with the handle it its first (closed) position.
Figure 4:
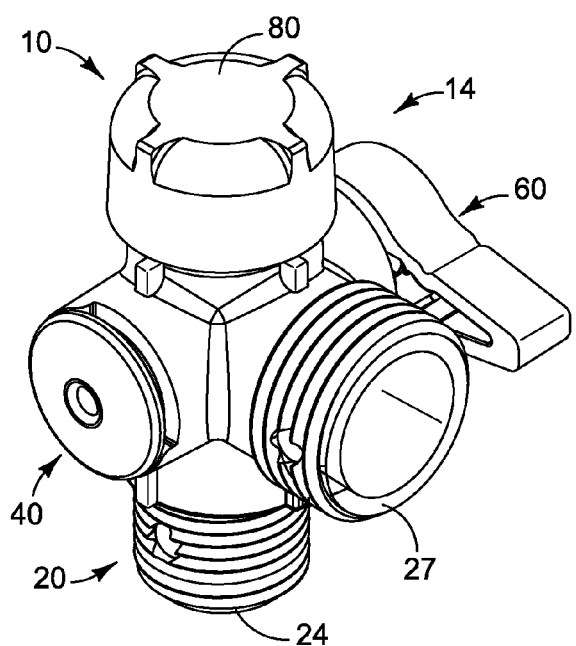
FIG. 4 is a second perspective view of the first exemplary water supply valve, shown in a second side mode, with the handle in its second (open) position.
Figure 5:
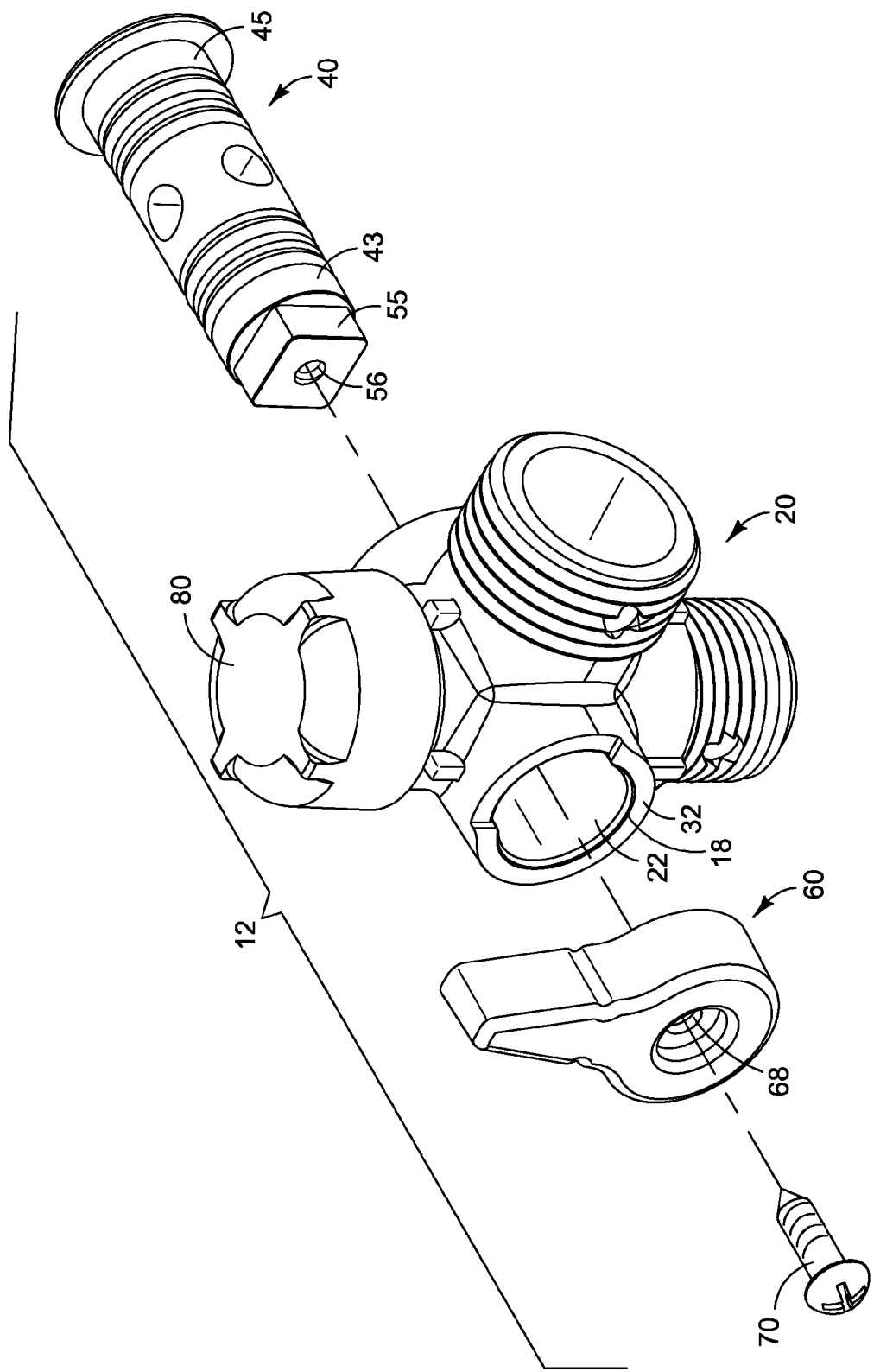
FIG. 5 is an exploded view of the first exemplary water supply valve of FIG. 1.

The rotatable valve shaft 40 is rotatable about the axis between a first position (illustrated in FIGS. 1 and 3) and a second position (illustrated in FIGS. 2 and 4). The first position corresponding to port-passageway registration, and the second position corresponding to complete closing of at least one of the valve shaft ports, for instance the closure of the first port 24 as illustrated in FIG. 12.

The rotatable valve shaft 40 further comprising a first sealing means 51 for sealing the first orifice 18 when in the first side mode 12, and a second sealing means 53 for sealing the second orifice 19 when in the first side mode 12. Likewise, the first sealing means 51 for sealing the second orifice 19 when in the second side mode 14, and the second sealing means 53 for sealing the first orifice 18 when in the second side mode 14. The first sealing means 51 and the second sealing means 53 illustrated in the Figures comprising at least one groove 46 for receiving an O-ring 52 therein. In the rotatable valve shaft 40 illustrated in the drawings, a pair of grooves 46 and O-rings 52 are utilized between the ports (42, 44, 47) and the first end 43, and a pair of grooves 46 and O-rings 52 are utilized between the ports (42, 44, 47) and the second end 45. The O-rings 52 for sealing against the seal surface 23 of the valve chamber 22.

The second end 45 comprising a stop flange 54 for contacting the first end 32 when the water supply valve 10 is in its first side mode 12, and for contacting the second end 33 when the water supply valve 10 is in its second side mode 14. The stop flange 54 having a diameter greater than the diameter of the first orifice 18 and second orifice 19, thereby assisting in the appropriate alignment of the rotatable valve shaft 40 in the valve chamber 22.

Figure 6:
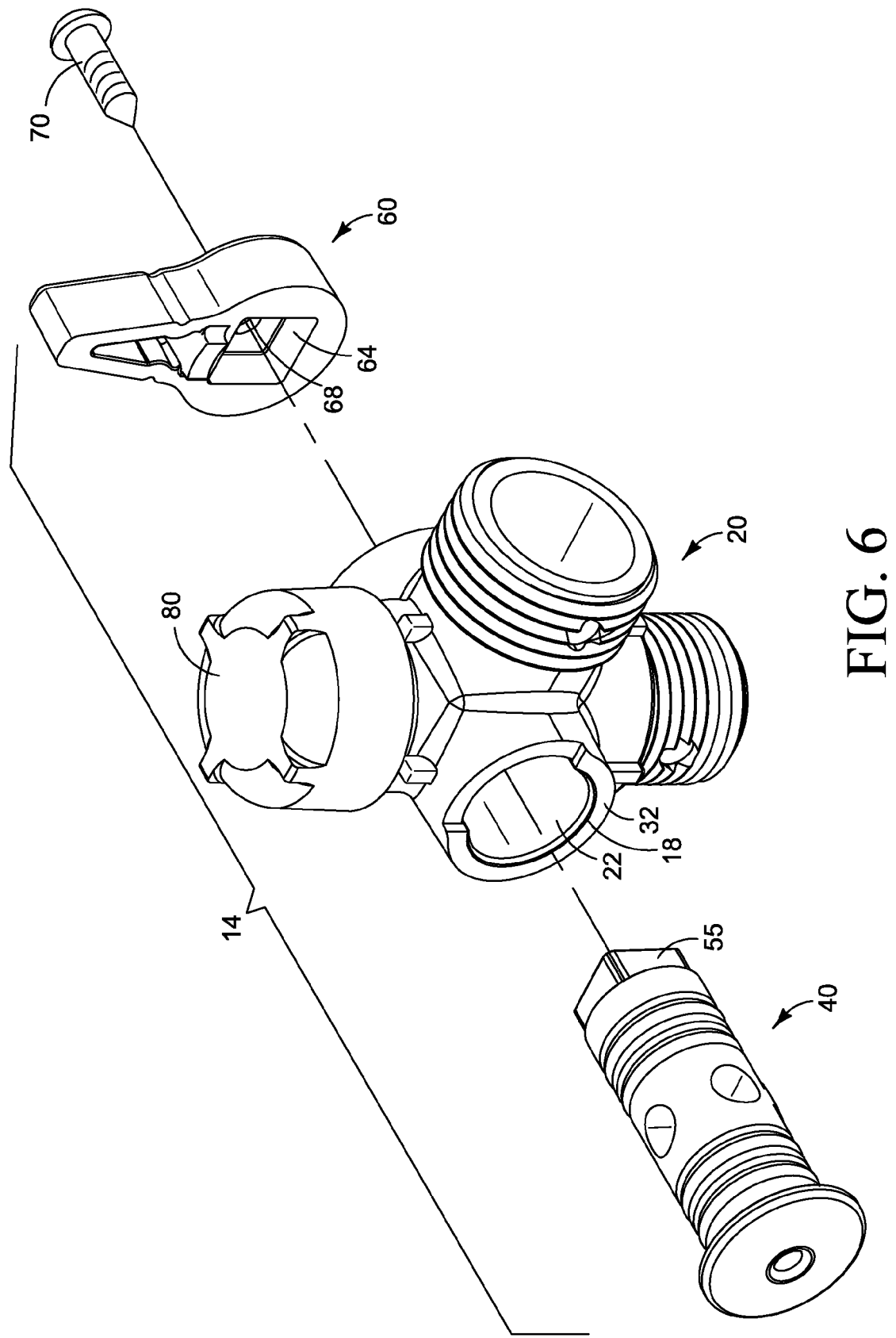
FIG. 6 is an exploded view of the first exemplary water supply valve of FIG. 3.
Figure 20:
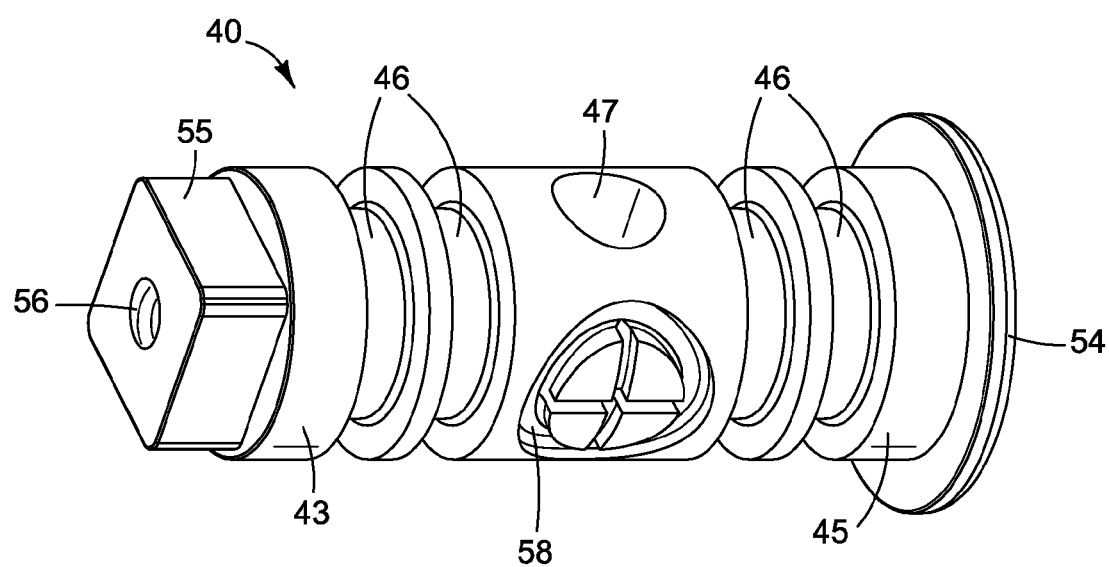
FIG. 20 is a perspective view of the rotatable valve shaft of an exemplary water supply valve.

The first end 43 comprising a handle connector 55 for connecting with the handle assembly 60, as particularly illustrated in FIG. 20. FIG. 20 illustrating the handle connector 55 comprising a boss sized for receipt into a drive recess 64 defined in the control handle 62 of the handle assembly 60, as illustrated in FIG. 6. The exemplary handle assembly 60 illustrated in FIG. 6 attaching to the rotatable valve shaft 40 through use of a fastener 70 (e.g., screw) inserted through a hole 68 defined in the handle 62 and threaded into threaded screw hole 56. While this manner of attaching the handle assembly 60 to the rotatable valve shaft 40 is illustrated in the drawings, other manners of making such an attachment could be utilized by a skilled artisan, including, but not limited to, the use of other types of mechanical fasteners and/or adhesives. For instance, a threaded shaft could extend from the rotatable valve shaft through a hole defined in the handle, with a nut threaded onto the threaded shaft to hold the handle on the valve shaft.

The handle assembly 60 permitting a user to rotate the rotatable valve shaft 40 between the first position to the second position, thereby allowing the user to open and close the valve.

Figures 7, 8:
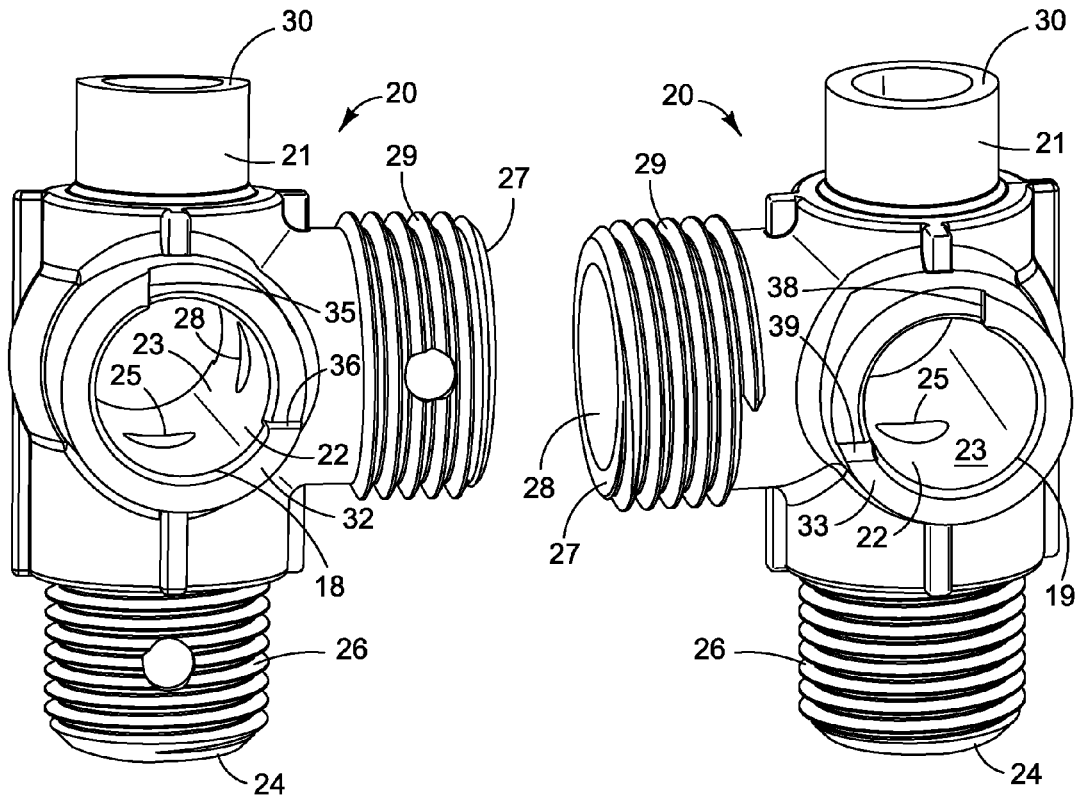
FIG. 7 is a partial, first side view of the first exemplary water supply valve.
FIG. 8 is a partial, second side view of the first exemplary water supply valve.

As illustrated in FIG. 7, the valve body first end 32 comprises a first stop 35 and a second stop 36 defining a first recess 34 there-between. As illustrated in FIG. 8, the valve body second end 33 comprises a third stop 38 and a fourth stop 39 defining a second recess 37 there-between. The first and second stops (35, 36) are spaced for limiting rotation of the rotatable valve shaft 40 (e.g., to ninety degrees). The third and fourth stops (38, 39) are spaced for limiting rotation of the rotatable valve shaft 40 (e.g., to ninety degrees). In the exemplary water supply valve 10 illustrated in the figures, the first stop 35 and the third stop 38 are oriented in a first plane; and the second stop 36 and the fourth stop 39 are oriented in a second plane. As such, when the water supply valve 10 is converted from its first side mode 12 to its second side mode 14, the valve body internal orifices are appropriately aligned with the rotatable valve shaft ports.

Figure 9:
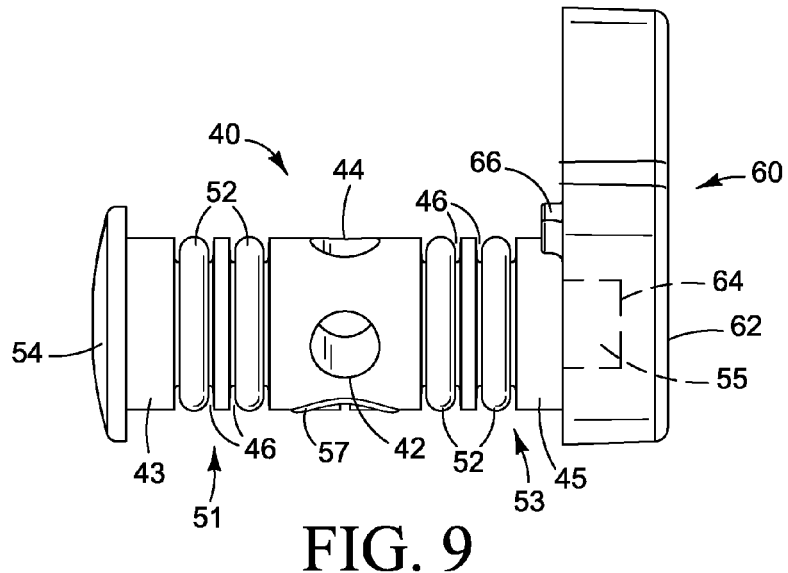
FIG. 9 is a side view of a handle and rotatable valve shaft of the first exemplary water supply valve.
Figure 11:
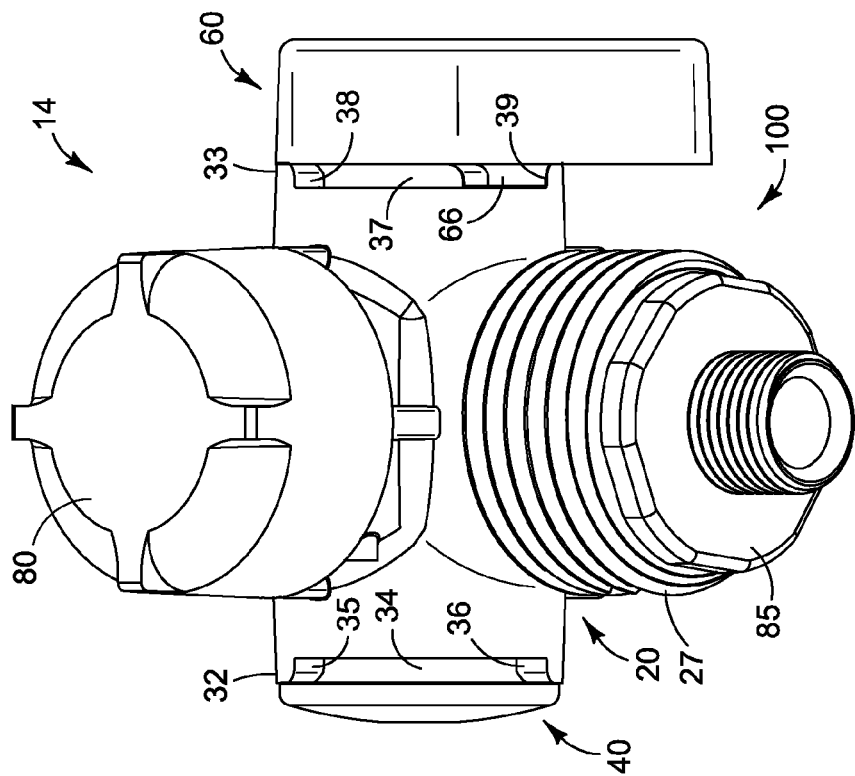
FIG. 11 is a top perspective view of a second exemplary water supply valve of FIG. 10, shown in a second side mode, with the handle in its second (open) position and an ice maker adapter connected to the second orifice.
Figure 10:
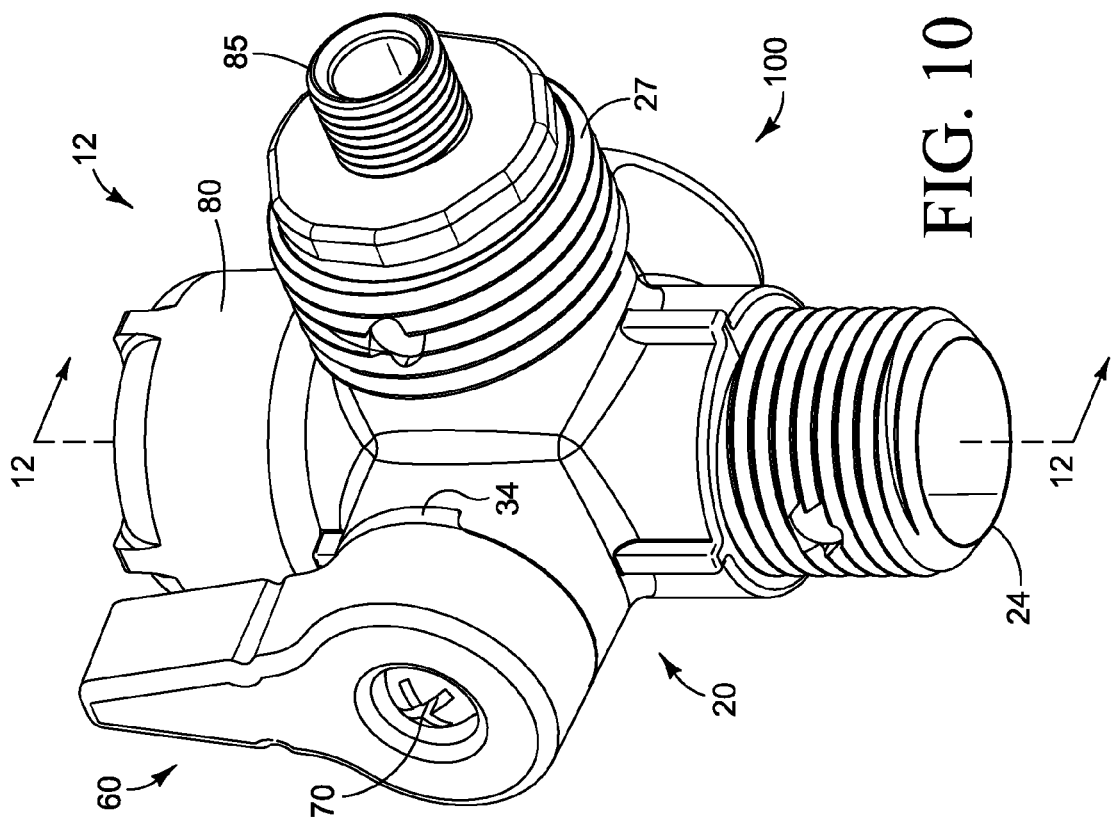
FIG. 10 is a bottom perspective view of a second exemplary water supply valve, shown in a first side mode, with the handle in its first (closed) position and an ice maker adapter connected to the second orifice.

As illustrated in FIG. 9, the handle assembly 60 comprising a flange 66. The flange 66 configured for receipt into the first recess 34 when the water supply valve 10 is in the first side mode 12, and configured for receipt into the second recess 37 when the water supply valve 10 is in the second side mode 14. The rotation of the handle assembly 60 limited by contact of the flange 66 to the first stop 35 and second stop 36 (when in the first side mode 12), and the third stop 38 and fourth stop 39 (when in the second side mode 14).

In the exemplary water supply valves 10 illustrated in the figures, contact of the flange 66 to the first stop 35 (when in the first side mode 12) or the third stop 38 (when in the first side mode 12) relates to the water supply valve 10 being in its closed configuration (as illustrated in FIG. 12) where the first orifice 25 is sealed via port sealing means 50, and only the second orifice 28 and the third orifice 31 are fluidly connected together via the valve shaft passageway 49. In the exemplary water supply valve illustrated in FIGS. 9, 12, 13, and 16 through 18, the port sealing means 50 comprises an annular groove 58 which receives an O-ring 57. Described is only one possible port sealing means which a skilled artisan would be expected to utilize, including, but not limited to, the use of other types of seals and sealing means.

In the exemplary water supply valves 10 illustrated in the figures, contact of the flange 66 to the second stop 36 (when in the first side mode 12) or the fourth stop 39 (when in the first side mode 12) relates to the water supply valve 10 being in its open configuration (as illustrated in FIG. 13) where the first orifice 25 fluidly connects to the first port 42, the second orifice 28 fluidly connects to the second port 44, and the third orifice 31 fluidly connects to the third port 47. FIG. 13 illustrating one possible direction of flow 75 through the water supply valve where the first port 24 is fluidly connected to a flow source.

In the first side mode 12, the rotatable valve shaft first end 43 is inserted through the body's first orifice 18 and into the valve chamber 22. In the second side mode 14, the rotatable valve shaft first end 43 is inserted through the body's second orifice 19 and into the valve chamber 22.

Referring to FIGS. 10 through 13, the second exemplary water supply valve 100 is shown. The second exemplary water supply valve 100 is similar to the first exemplary water supply valve 10 illustrated in FIGS. 1 through 9 and described above, except the second exemplary water supply valve 100 is illustrated as having an ice maker adapter 85 connected to the second port 27 of the valve body 20.

Figure 21:
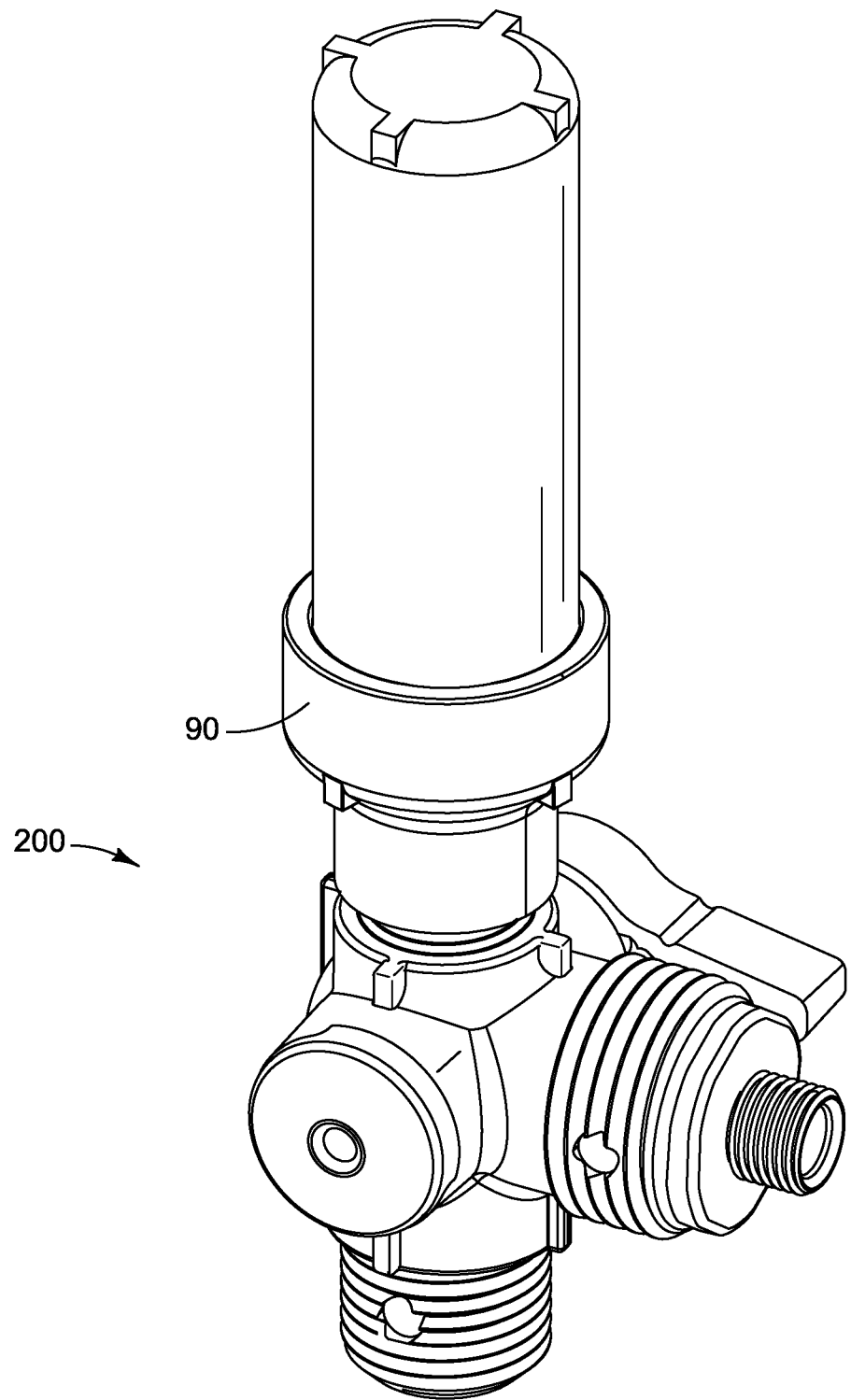
FIG. 21 is a perspective view of a third exemplary water supply valve.

Referring to FIG. 21, the third exemplary water supply valve is shown. The third exemplary water supply valve 200 is similar to the first exemplary water supply valve 10 illustrated in FIGS. 1 through 9 and described above, except the third exemplary water supply valve 200 is illustrated as having an ice maker adapter 85 connected to the second port 27 of the valve body 20, and a water hammer arrester 90 connected to the third port 30 of the valve body.

Figure 22:
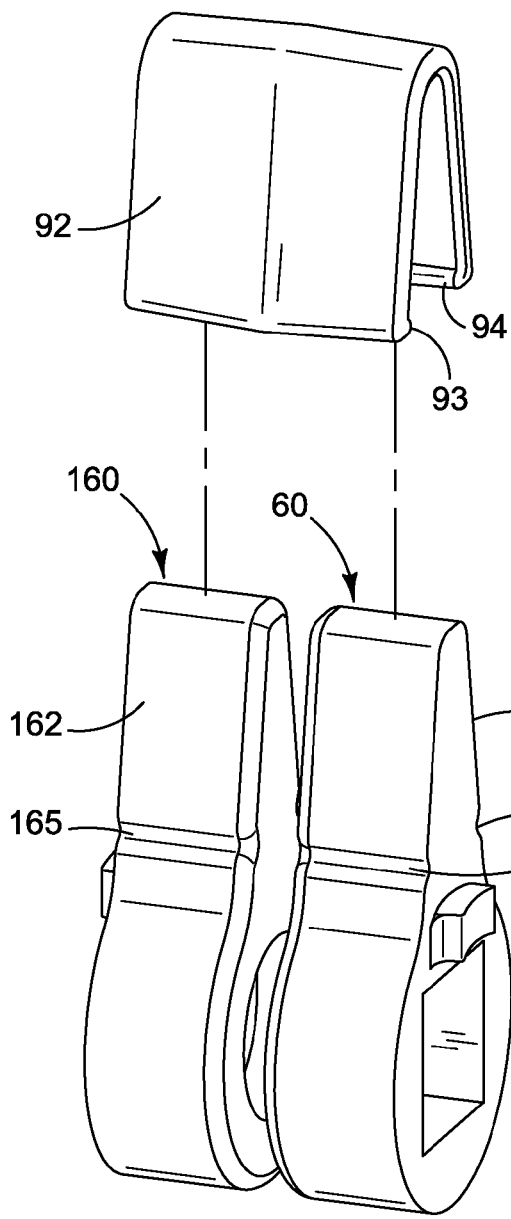
FIG. 22 is a partial, exploded, perspective view of a first exemplary clip used to interconnect two adjacent handle assemblies.
Figure 23:
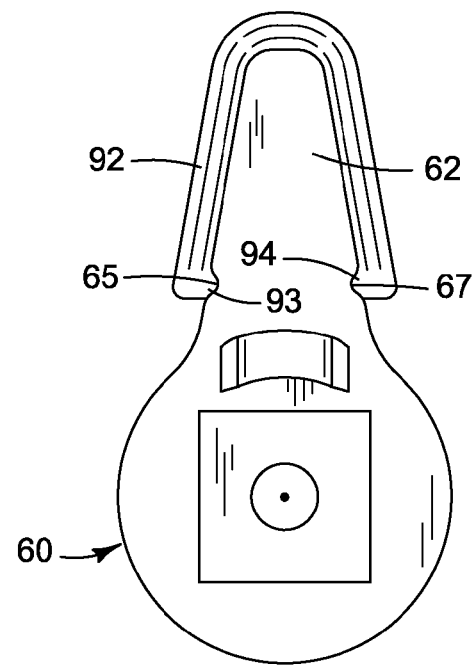
FIG. 23 is a partial side view of the clip of FIG. 22, shown clipped onto the handle assemblies.
Figure 24:
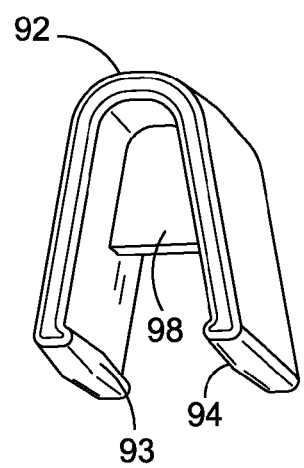
FIG. 24 is a perspective view of the clip of FIG. 22.

FIGS. 22 through 24 illustrate a first exemplary clip 92 used to interconnect two adjacent handle assemblies (60, 160). In use, a plumber may install a first water supply valve adjacent a second water supply valve, for instance, when plumbing a washing machine connection needing a hot water supply and a cold water supply. If the handle assemblies for these two water supply valves face one another, and the water supply valves are mounted close enough together, a clip 92 can be used to connect both the first (left) and second (right) handle assemblies together, thereby allowing an operator of the valves to digitally manipulate a single lever to open and close the valves together.

The first exemplary clip 92 illustrated in these figures comprising a generally U-shaped body having a first flange portion 93 and a second flange portion 94. These flange portions (93, 94) configured for engaging the handle assemblies (60, 160), for instance, by sliding onto the control handle (62, 162) and snapping into a first side recess (65, 165) and/or snapping into a second side recess (67). The first exemplary clip 92, as illustrated in FIG. 24, may include a center divider 98 for limiting lateral movement of the clip 92 when installed on handle assemblies (60, 160). While this "clip" style is illustrated in the figures, other manners and means of connecting the two handle assemblies together would also work, including mechanical means, adhesives, fasteners, welding, etc.

As such, the water supply valve 10 is convertible from a first side mode 12 where, when viewing the water supply valve 10 with the second port 27 facing the viewer, the handle assembly 60 is on the "left" side of the water supply valve 10, to a second side mode 14 where, when viewing the water supply valve 10 with the second port 27 facing the viewer, the handle assembly 60 is on the "right" side of the water supply valve 10. Being interchangeable allows a plumber to interchangeably use a single valve as either a "left" or a "right" valve as needed in a particular installation without having to have both "left" and "right" valves in his/her possession. Being interchangeable also is beneficial for the manufacturing process (only one type of valve assembly needs to be made).

To make the conversion from a first side mode 12 to a second side mode 14 of the exemplary water supply valves illustrated in the Figures, the fastener 70 would be loosened to separate the handle assembly 60 from the rotatable valve shaft 40. The rotatable valve shaft 40 would then be withdrawn from the valve chamber 22 and out the first orifice 18. The first end 43 of the rotatable valve shaft 40 would then be inserted through the second orifice 19, into the valve chamber 22, and out of the first orifice 18. The control handle drive recess 64 receiving therein the control handle connector 55, thereby, with the fastener 70, locking the rotation of the two together. Conversion to the other mode is done the opposite way.

In a fourth exemplary water supply valve (not shown in the figures), no top port is present.

In a fifth exemplary water supply valve, the top port connects with another plumbing connector, including but not limited to bushings, couplings, elbows, t-joints, and reducers.

In a sixth exemplary water supply valve, the bottom port connects with a CPVC connector.

In a seventh exemplary water supply valve, the bottom port connects with a MIP connector.

In an eighth exemplary water supply valve, the bottom port connects with a PEX connector.

In a ninth exemplary water supply valve, the outlet port includes another plumbing connector, including but not limited to bushings, couplings, elbows, t-joints, and reducers.

In a tenth exemplary water supply valve, the valve body does not comprise a third port.

In an eleventh exemplary water supply valve, the valve body includes more than three ports.

In a twelfth exemplary water supply valve, the rotatable valve shaft includes more than three ports.

Any suitable structure and/or material can be used for the components of an exemplary water supply valve, and a skilled artisan will be able to select an appropriate structure and material for the components in a particular embodiment based on various considerations, including the intended use of the water supply valve, the intended environment within which the water supply valve will be used, and the equipment and/or accessories with which the water supply valve is intended to be used, among other considerations.

It is noted that all structure and features of the various described and illustrated embodiments can be combined in any suitable configuration for inclusion in a water supply valve according to a particular embodiment. For example, a water supply valve according a particular embodiment can include two, three, or more valve body ports, and/or two, three, or more rotatable shaft ports.

Any suitable materials can be used to form the various components of the water supply valve, and a skilled artisan will be able to select appropriate materials for a water supply valve according to a particular embodiment based on various considerations, including the environment within which the water supply valve is intended to be used, fluid flow velocities, fluid pressure, fluid temperature, and the chemical composition of the fluid to which the water supply valve is intended to be exposed. The inventors have determined that conventional polymeric and metal materials are suitable for use in the various components of the water supply valve. For example, the water supply valve and associated components can be injection-molded from suitable plastics known in the art, or can be formed from metal materials, including stainless steel and other suitable metals. Materials hereinafter discovered and/or developed that are determined to be suitable for use in water supply valve devices would also be considered suitable for use in a water supply valve according to a particular embodiment.

The foregoing detailed description provides exemplary embodiments of the invention and includes the best mode for practicing the invention. The description and illustration of these embodiments is intended only to provide examples of the invention, and not to limit the scope of the invention, or its protection, in any manner.

What is claimed is:

1. A water supply valve convertible between a first side mode and a second side mode, said water supply valve comprising:

a valve body comprising: a valve body first end comprising a first orifice, a valve body second end comprising a second orifice, a valve chamber defined between said first orifice and said second orifice, a first valve body port extending via a first passageway to said valve chamber, a second valve body port extending via a second passageway to said valve chamber, and a third valve body port extending via a third passageway into said valve chamber, wherein said third valve body port comprises a plumbing connector, and wherein a water hammer arrester fluidly connects to said plumbing connector;

a rotatable valve shaft comprising a rotatable valve shaft first end and a rotatable valve shaft second end, said rotatable valve shaft having an axis of rotation, said rotatable valve shaft having a first valve shaft port, a second valve shaft port, and a third valve shaft port, said valve shaft ports fluidly connected via a valve shaft passageway, said valve shaft ports normally registering with said passageways, said rotatable valve shaft rotatable about said axis between a first position and a second position, said first position corresponding to port registration, and the second position corresponding to complete closing of at least one of said valve shaft ports, said rotatable valve shaft further comprising a first sealing means and a second sealing means, said first end comprising a handle connector for connecting with a handle; and said handle for connecting with said handle connector, said handle permitting a user to rotate said rotatable valve shaft between said first position and said second position, wherein said water supply valve comprising said first side mode wherein said rotatable valve shaft first end is inserted through said first orifice and into said valve chamber, and said second side mode wherein said rotatable valve shaft first end is inserted through said second orifice and into said valve chamber, said first sealing means for sealing said first orifice when in the first side mode and said second orifice when in the second side mode, and said second sealing means for sealing said second orifice when in the first side mode and said first orifice when in said second side mode.

2. The water supply valve of claim 1, wherein said first sealing means comprises at least one O-ring, and wherein said second sealing means comprises at least one O-ring.

3. The water supply valve of claim 1, wherein when said first side mode, said first, second and third ports are fluidly connected, and wherein when in said second side mode only said second and third ports are fluidly connected.

4. The water supply valve of claim 1, wherein said valve body first end comprises a first stop and a second stop defining a first recess there-between, and wherein said valve body second end comprises a third stop and a fourth stop defining a second recess there-between.

5. The water supply valve of claim 4, further comprising a flange configured for receipt into said first recess when said water supply valve is in said first side mode, and configured for receipt into said second recess when said water supply valve is in said second side mode.

6. The water supply valve of claim 5, wherein said handle comprises said flange.

7. The water supply valve of claim 5, wherein said first and second stops are spaced for limiting rotation of the rotatable valve shaft, and wherein said third and fourth are spaced for limiting rotation of the rotatable valve shaft.

8. The water supply valve of claim 7, wherein said first and third stops are oriented in a first plane, and said second and fourth stops are oriented in a second plane.

9. The water supply valve of claim 1, wherein said second valve body port comprises an ice maker adapter for connecting with a water supply line for an ice maker.

10. A water supply valve convertible between a first side mode and a second side mode, said water supply valve comprising:

a valve body comprising: a valve body first end comprising a first orifice, a valve body second end comprising a second orifice, a valve chamber defined between said first orifice and said second orifice, a first valve body port extending via a first passageway to said valve chamber, a second valve body port extending via a second passageway to said valve chamber, and a third valve body port extending via a third passageway into said valve chamber;

a rotatable valve shaft comprising a rotatable valve shaft first end and a rotatable valve shaft second end, said rotatable valve shaft having an axis of rotation, said rotatable valve shaft having a first valve shaft port, a second valve shaft port, and a third valve shaft port, said valve shaft ports fluidly connected via a valve shaft passageway, said valve shaft ports normally registering with the valve body passageways, said rotatable valve shaft rotatable about said axis between a first position and a second position, said first position corresponding to port registration, and the second position corresponding to complete closing of at least one of said valve shaft ports, said rotatable valve shaft further comprising a first sealing means and a second sealing means, said first end comprising a handle connector for connecting with a handle, wherein said first end comprises a first stop and a second stop defining a first recess there-between, and wherein said second end comprises a third stop and a fourth stop defining a second recess there-between; and said handle for connecting with said handle connector, said handle permitting a user to rotate said rotatable valve shaft between said first position and said second position; and wherein said water supply valve comprising said first side mode wherein said rotatable valve shaft first end is inserted through said first orifice and into said valve chamber, and said second side mode wherein said rotatable valve shaft first end is inserted through said second orifice and into said valve chamber, wherein said handle comprising a flange configured for receipt into said first recess when said water supply valve is in said first side mode, and configured for receipt into said second recess when said water supply valve is in said second side mode;

wherein when said first side mode, said first, second and third ports are fluidly connected, and wherein when in said second side mode only said second and third ports are fluidly connected; and wherein said first sealing means for sealing said first orifice when in the first side mode and said second orifice when in the second side mode, and said second sealing means for sealing said second orifice when in the first side mode and said first orifice when in said second side mode.

11. The water supply valve of claim 10, wherein said first sealing means comprises at least one O-ring, and wherein said second sealing means comprises at least one O-ring.

12. The water supply valve of claim 10, wherein:

said valve body first end comprises a first stop and a second stop defining a first recess there-between, said valve body second end comprises a third stop and a fourth stop defining a second recess there-between, said handle comprises a flange, said flange configured for receipt into said first recess when said water supply valve is in said first side mode, said flange configured for receipt into said second recess when said water supply valve is in said second side mode, said first and second stops are spaced for limiting rotation of the rotatable valve shaft, said third and fourth are spaced for limiting rotation of the rotatable valve shaft, and said first and third stops are oriented in a first plane, and said second and fourth stops are oriented in a second plane.

13. A water supply valve convertible between a first side mode and a second side mode, said water supply valve comprising:

a valve body comprising: a valve body first end comprising a first orifice, a valve body second end comprising a second orifice, a valve chamber defined between said first orifice and said second orifice, a first valve body port extending via a first passageway to said valve chamber, a second valve body port extending via a second passageway to said valve chamber, and a third valve body port extending via a third passageway into said valve chamber;

a rotatable valve shaft comprising a rotatable valve shaft first end and a rotatable valve shaft second end, said rotatable valve shaft having an axis of rotation, said rotatable valve shaft having a first valve shaft port, a second valve shaft port, and a third valve shaft port, said valve shaft ports fluidly connected via a valve shaft passageway, said valve shaft ports normally registering with said passageways, said rotatable valve shaft rotatable about said axis between a first position and a second position, said first position corresponding to port registration, and the second position corresponding to complete closing of at least one of said valve shaft ports, said rotatable valve shaft further comprising a first sealing means and a second sealing means, said first end comprising a handle connector for connecting with a handle; and said handle for connecting with said handle connector, said handle permitting a user to rotate said rotatable valve shaft between said first position and said second position, wherein said water supply valve comprising said first side mode wherein said rotatable valve shaft first end is inserted through said first orifice and into said valve chamber, and said second side mode wherein said rotatable valve shaft first end is inserted through said second orifice and into said valve chamber, said first sealing means for sealing said first orifice when in the first side mode and said second orifice when in the second side mode, and said second sealing means for sealing said second orifice when in the first side mode and said first orifice when in said second side mode, and wherein said valve body first end comprises a first stop and a second stop defining a first recess there-between, and wherein said valve body second end comprises a third stop and a fourth stop defining a second recess there-between.

14. The water supply valve of claim 13, wherein said first sealing means comprises at least one O-ring, and wherein said second sealing means comprises at least one O-ring.

15. The water supply valve of claim 13, wherein when said first side mode, said first, second and third ports are fluidly connected, and wherein when in said second side mode only said second and third ports are fluidly connected.

16. The water supply valve of claim 13, further comprising a flange configured for receipt into said first recess when said water supply valve is in said first side mode, and configured for receipt into said second recess when said water supply valve is in said second side mode.

17. The water supply valve of claim 16, wherein said handle comprises said flange.

18. The water supply valve of claim 16, wherein said first and second stops are spaced for limiting rotation of the rotatable valve shaft, and wherein said third and fourth stops are spaced for limiting rotation of the rotatable valve shaft.

19. The water supply valve of claim 18, wherein said first and third stops are oriented in a first plane, and said second and fourth stops are oriented in a second plane.

20. A water supply valve convertible between a first side mode and a second side mode, said water supply valve comprising:

a valve body comprising: a valve body first end comprising a first orifice, a valve body second end comprising a second orifice, a valve chamber defined between said first orifice and said second orifice, a first valve body port extending via a first passageway to said valve chamber, a second valve body port extending via a second passageway to said valve chamber, and a third valve body port extending via a third passageway into said valve chamber;

a rotatable valve shaft comprising a rotatable valve shaft first end and a rotatable valve shaft second end, said rotatable valve shaft having an axis of rotation, said rotatable valve shaft having a first valve shaft port, a second valve shaft port, and a third valve shaft port, said valve shaft ports fluidly connected via a valve shaft passageway, said valve shaft ports normally registering with said passageways, said rotatable valve shaft rotatable about said axis between a first position and a second position, said first position corresponding to port registration, and the second position corresponding to complete closing of at least one of said valve shaft ports, said rotatable valve shaft further comprising a first sealing means and a second sealing means, said first end comprising a handle connector for connecting with a handle; and said handle for connecting with said handle connector, said handle permitting a user to rotate said rotatable valve shaft between said first position and said second position, wherein said water supply valve comprising said first side mode wherein said rotatable valve shaft first end is inserted through said first orifice and into said valve chamber, and said second side mode wherein said rotatable valve shaft first end is inserted through said second orifice and into said valve chamber, said first sealing means for sealing said first orifice when in the first side mode and said second orifice when in the second side mode, and said second sealing means for sealing said second orifice when in the first side mode and said first orifice when in said second side mode, and wherein said second valve body port comprises an ice maker adapter for connecting with a water supply line for an ice maker.

* * * * *